United States Patent [19]

Allen et al.

[11] Patent Number: 5,999,754
[45] Date of Patent: Dec. 7, 1999

[54] COMPACT CAMERA WITH FRAME COUNTER MADE FLEXIBLE TO CONSERVE SPACE

[75] Inventors: Loretta E. Allen, Hilton; Dennis R. Zander, Penfield, both of N.Y.

[73] Assignee: Eastman Kodak Company, Rochester, N.Y.

[21] Appl. No.: 09/188,965

[22] Filed: Nov. 10, 1998

[51] Int. Cl.[6] .................................................. G03B 17/24
[52] U.S. Cl. ............................................................ 396/284
[58] Field of Search .................................... 396/6, 284

[56] References Cited

U.S. PATENT DOCUMENTS

| | | |
|---|---|---|
| 422,686 | 3/1890 | Altick . |
| 1,219,672 | 3/1917 | Schoenleber . |
| 2,585,451 | 2/1952 | Frankel . |
| 3,677,147 | 7/1972 | Kremp et al. . |
| 3,836,691 | 9/1974 | Wolfe . |
| 4,114,172 | 9/1978 | Yao . |
| 4,645,322 | 2/1987 | Stella et al. . |
| 5,339,125 | 8/1994 | Fridman et al. . |

*Primary Examiner*—David M. Gray
*Attorney, Agent, or Firm*—Roger A. Fields

[57] ABSTRACT

A compact camera comprising a frame counter disk supported for rotation to indicate the number of exposures remaining to be made on a filmstrip, is characterized in that the frame counter disk is flexible, has a curved periphery, is bent along a straight line joining two spaced points on the curved periphery to be located in two different planes in order to conserve space, and has a plurality of exposure related indicia that is moved successively from one of the planes to the other plane as the frame counter disk is rotated.

8 Claims, 3 Drawing Sheets

COMPACT CAMERA WITH FRAME COUNTER MADE FLEXIBLE TO CONSERVE SPACE

CROSS REFERENCE TO RELATED APPLICATION

Reference is made to commonly assigned copending application Ser. No. 09/189,457, entitled COMPACT CAMERA WITH FRAME COUNTER AND VIEWFINDER INTEGRATED TO CONSERVE SPACE and filed Nov. 10, 1998 in the names of Loretta E. Allen and Roger A. Siekierski.

FIELD OF THE INVENTION

The invention relates generally to the field of photography, and in particular to compact cameras. More specifically, the invention relates to a compact camera with a frame counter that is made flexible to substantially conform to the shape of the camera in order to conserve space.

BACKGROUND OF THE INVENTION

Film and cameras that are all in one, commonly referred to as one-time-use cameras, have become well known. The one-time-use camera is a simple point-and-shoot type comprising a plastic main body part which supports a conventional film cassette in a cassette receiving or film take-up chamber, an unexposed film roll prewound on a film spool in a film supply chamber from the film cassette, a fixed-focus taking lens, a film metering mechanism with a rotatably supported metering sprocket that engages the filmstrip, a manually rotatable film winding thumbwheel rotatably engaged with a film spool inside the film cassette, a single-blade shutter, a manually depressible shutter release button, a rotatable frame counter disk or wheel for indicating the number of exposures remaining to be made on the filmstrip, a direct see-through viewfinder, and in some models an electronic flash. A pair of plastic front and rear cover parts house the main body part between them to complete the camera unit. The rear cover part connects to the main body part and/or to the front cover part to make the main body part light-tight. A decorative cardboard outer box or label at least partially covers the camera unit and has respective openings for the taking lens, etc.

After each picture is taken with the one-time-use camera, the photographer manually rotates the thumbwheel in a film winding direction to similarly rotate the film spool inside the film cassette. This winds an exposed section of the filmstrip into the film cassette. The rewinding movement of the filmstrip the equivalent of slightly more than one frame width rotates the metering sprocket in engagement with the filmstrip to decrement the frame counter disk to its next lower-numbered setting and to pivot a metering lever into engagement with the thumbwheel to prevent further manual rotation of the thumbwheel. Manually depressing the shutter release button to take another picture pivots the metering lever out of engagement with the thumbwheel to permit renewed rotation of the thumbwheel. When the maximum number of exposures available on the filmstrip have been made, and the filmstrip is completely wound into the film cassette, the one-time-use camera is given to a photofinisher who tears the outer box off the camera unit, separates the rear cover part from the main body part, and removes the film cassette with the exposed filmstrip from the film take-up chamber. Then, he removes the exposed filmstrip from the film cassette to develop the negatives and make prints for the customer. At least some of the used camera parts may be recycled, i.e. reused, to remanufacture the camera.

Problem

It is a continuing challenge to make one-time-use cameras as compact as is reasonably possible.

The Cross-Referenced Application

Cross-referenced application Ser. No. 09/189,457, entitled COMPACT CAMERA WITH FRAME COUNTER AND VIEWFINDER INTEGRATED TO CONSERVE SPACE discloses a compact camera which comprises an optical viewfinder having a pair of spaced front objective and rear eye lenses for viewing a subject to be photographed when one's eye is brought close to the rear eye lens to look at the subject through the viewfinder, and a frame counter supported for movement in a space between the front objective and rear eye lenses to view exposure related indicia of the frame counter when looking through the viewfinder. The said frame counter has a transparent carrier for the exposure related indicia which is movable adjacent the rear eye lens to permit the exposure related indicia to be viewed through the viewfinder only when one's eye is farther from the rear eye lens than when one's eye is brought close to the rear eye lens to look at the subject to be photographed and to permit one to view the subject without seeing the exposure related indicia when one's eye is brought close to the rear eye lens.

SUMMARY OF THE INVENTION

A compact camera comprising a frame counter disk supported for rotation to indicate the number of exposures remaining to be made on a filmstrip, is characterized in that:

the frame counter disk is flexible, has a curved periphery, is bent along a straight line joining two spaced points on the curved periphery to be located in two different planes in order to conserve space, and has a plurality of exposure related indicia that is moved successively from one of the planes to the other plane as the frame counter disk is rotated.

DETAILED DESCRIPTION OF THE INVENTION

The invention is disclosed as being embodied preferably in a one-time-use camera. Because the features of a one-time-use camera are generally known, the description which follows is directed in particular only to those elements forming part of or cooperating directly with the disclosed embodiment. It is to be understood, however, that other elements may take various forms known to a person of ordinary skill in the art.

Figure 1:
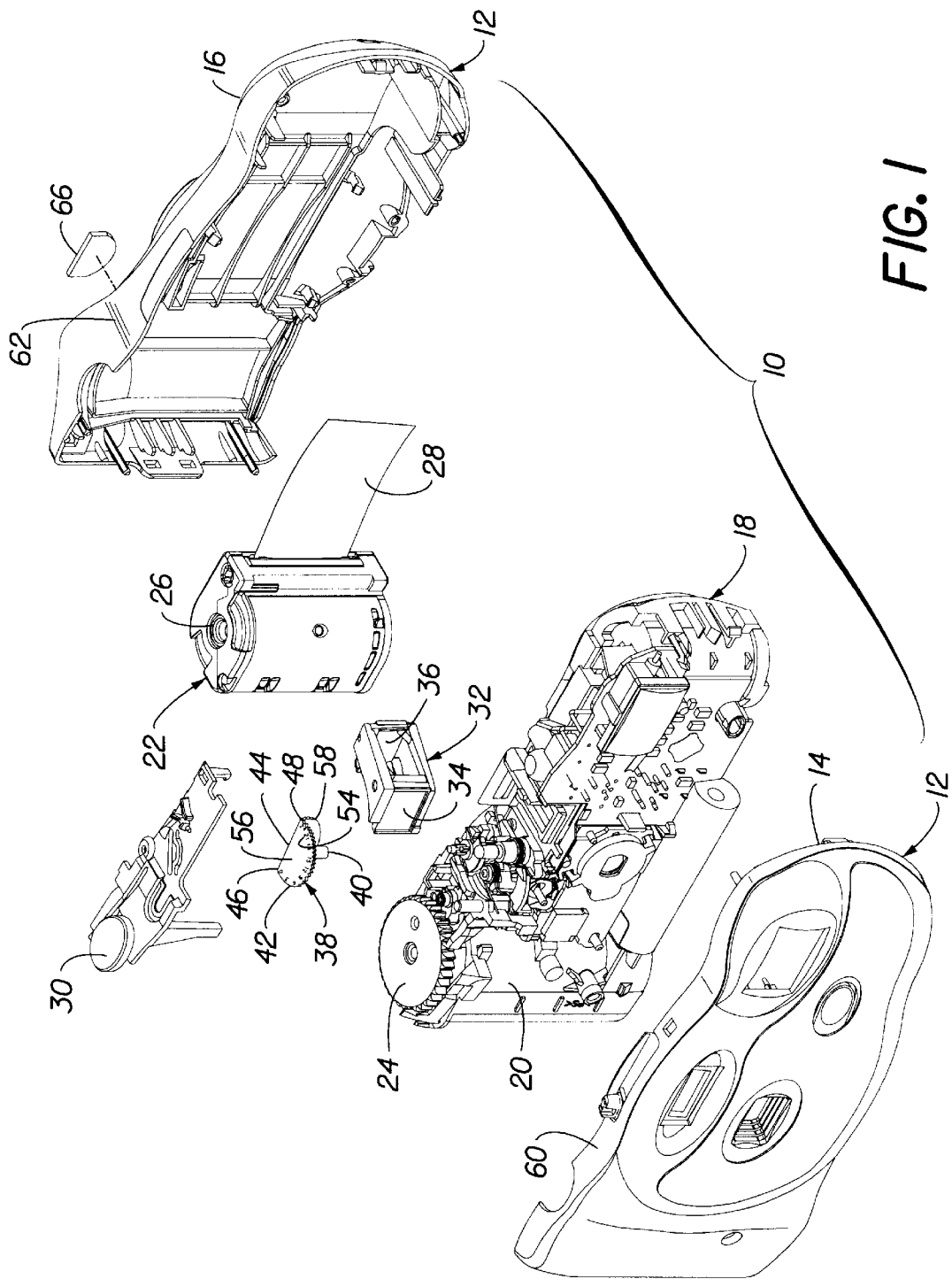
FIG. 1 is an exploded front perspective view of a one-time-use camera according to a preferred embodiment of the invention.
Figure 2:
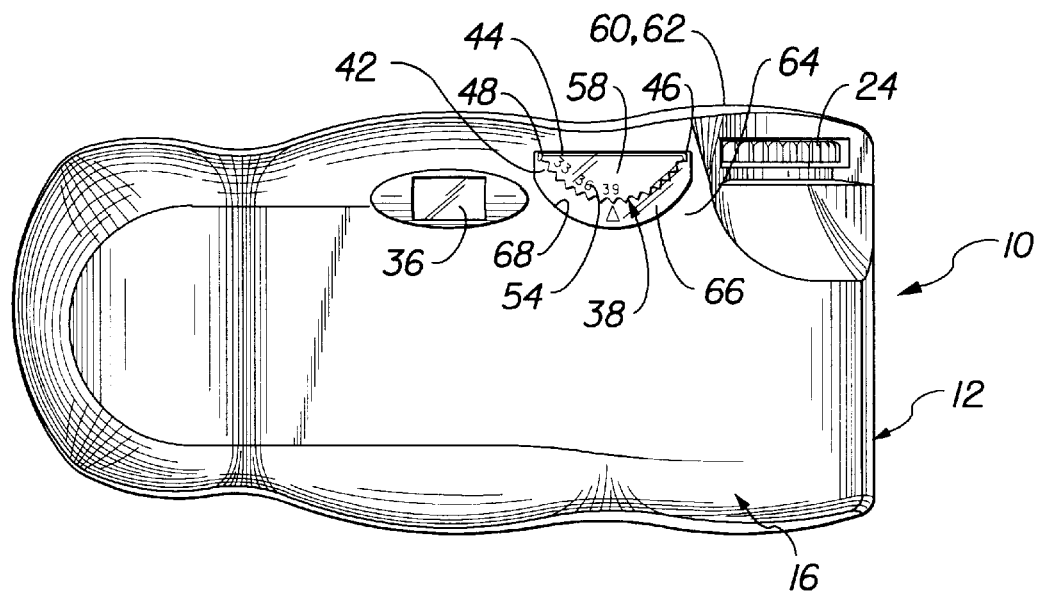
FIG. 2 is a rear elevation view of the assembled camera depicted in FIG. 1.
Figure 3:
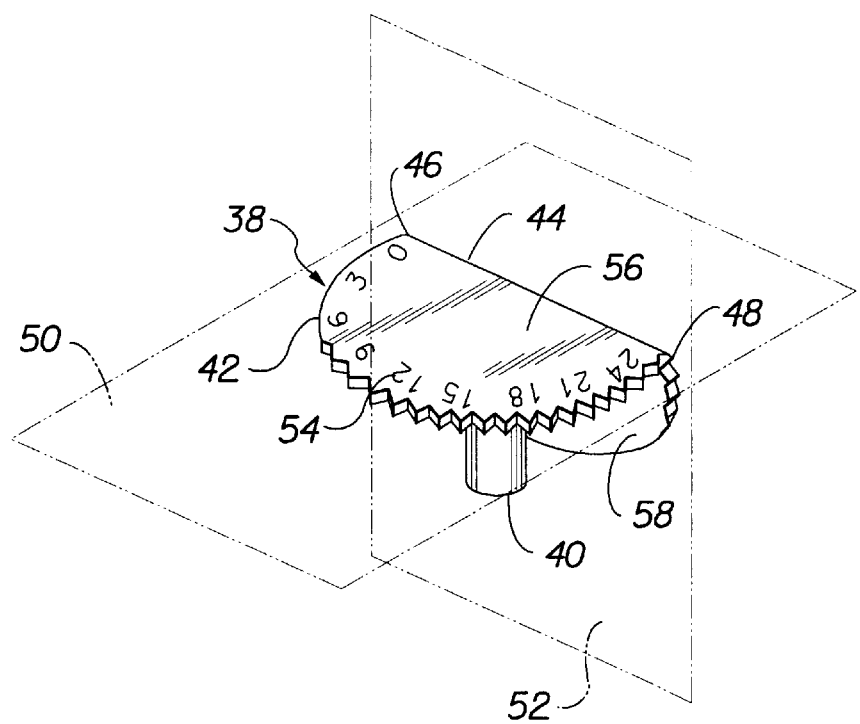
FIG. 3 is a front perspective view of a flexible exposure counter disk rotatably supported in the camera housing of FIGS. 1 and 2.

Preferred Embodiment—FIGS. 1, 2 and 3

Referring now to the drawings, FIG. 1 shows a one-time-use camera 10 in which an opaque camera housing 12 constitutes a front cover part 14 and a rear cover part 16. The front cover part 14 and the rear cover part 16 are connected to one another and to a main body part 18 to house the main body part between them.

The main body part 18 has a cassette receiving or film take-up chamber 20 for a known film cassette 22. A film winding thumbwheel 24 rotatably supported on the main body part is 18 is coaxially engaged with a film spool 26 inside the film cassette 22. After each picture is taken with the one-time-use camera 10, the photographer manually rotates the thumbwheel 24 in a film winding direction, counter-clockwise in FIG. 1, to similarly rotate the film spool 26 inside the film cassette 22. This winds an exposed section of a filmstrip 28 into the film cassette 22. A cantilevered shutter release button 30 is supported on the main body part 18 to be manually depressed to initiate picture-taking. A viewfinder assembly 32 having a pair of front and rear viewfinder lenses 34 and 36 is connected to the main body part 18 for viewing a subject to be photographed.

As shown in FIGS. 1 and 2, a frame counter disk 38 for indicating the number of exposures remaining to be made on the filmstrip 28 has an integral spindle 40 that is rotatably supported on the main body part 18. The frame counter disk 38 is resilient and flexible, has a curved periphery 42, is bent along a straight line 44 joining two spaced points 46 and 48 on the curved periphery to be located in two different horizontal and vertical perpendicular planes 50 and 52 in order to conserve space within the camera housing 12, and has a plurality of exposure related indicia 54 that is moved successively from one of the planes to the other plane as the frame counter disk is rotated. The frame counter disk 38 is bent to form a major portion 56 in the horizontal plane 50 and a minor portion 58 smaller than the major portion in the vertical plane 52. The spindle 40 depends from the major portion 56 of the frame counter disk 38 to hold the major portion in the horizontal plane 50. Several retaining clips (not shown) integral with the main body part 18 or the rear cover part 16 hold the minor portion 58 of the frame counter disk 38 in the vertical plane 52.

Respective abutting top portions 60 and 62 of the camera front and rear cover parts 14 and 16 are positioned adjacent the horizontal plane 50 to cover the major portion 56 of the frame counter disk 38, to prevent the major portion from being seen. See FIG. 1. A rear portion 64 of the rear cover part 16 supports a viewing lens 66 within a lens opening 68 in the rear cover part. The viewing lens 66 is positioned adjacent the vertical plane 52 to cover the minor portion 58 of the frame counter disk 38, to permit the exposure related indicia 54 to be successively seen through the viewing lens as the frame counter disk 38 is rotated. See FIG. 2.

Figure 4:
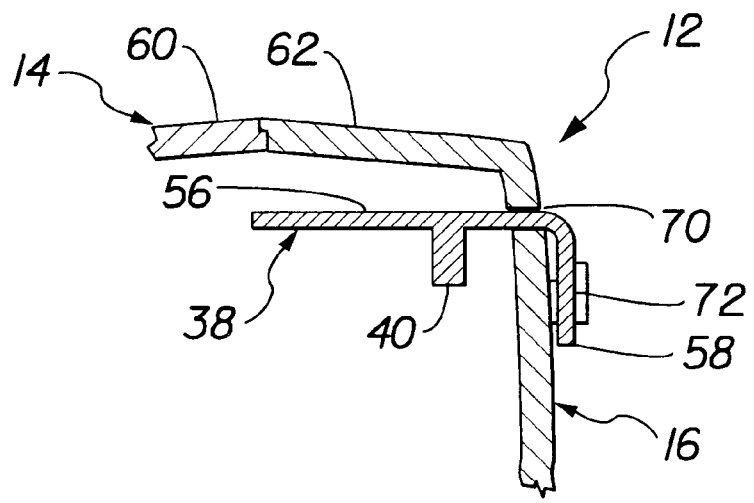
FIG. 4 is a side elevation sectional of the exposure counter disk according to an alternate embodiment of the invention.
Figure 5:
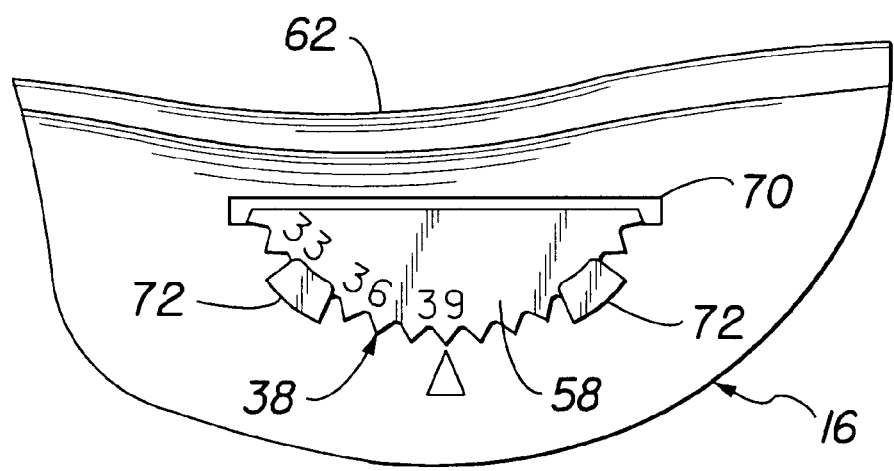
FIG. 5 is a rear elevation view similar to FIG. 2, but showing the alternate embodiment.

Alternate Embodiment—FIGS. 4 and 5

All things are the same in the alternate embodiment as in the preferred embodiment, except as follows.

The rear cover part 16 has a narrow opening 70 for the frame counter disk 38. The frame counter disk 38 protrudes through the narrow opening 70 to locate the minor portion 58 of the frame counter disk outside the camera housing 12. Several retaining clips 72 integral with the rear cover part 16 hold the minor portion 58 of the frame counter disk 38 in the vertical plane 52.

The invention has been described with reference to a preferred embodiment. However, it will be appreciated that variations and modifications can be effected by a person of ordinary skill in the art without departing from the scope of the invention. For example, the viewing lens 66 instead of being at the rear portion 64 of the rear cover part 16 could be at the abutting top portions 60 and 62 of the camera front and rear cover parts 14 and 16.

PARTS LIST

10. one-time-use camera
12. camera housing
14. front cover part
16. rear cover part
18. main body part
20. cassette receiving chamber
22. film cassette
24. film winding thumbwheel
26. film spool
28. filmstrip
30. shutter release button
32. viewfinder assembly
34. front viewfinder lens
36. rear viewfinder lens
38. frame counter disk
40. spindle
42. curved periphery
44. straight line
46. point
48. point
50. horizontal plane
52. vertical plane
54. exposure related indicia
56. major portion
58. minor portion
60. top portion
62. top portion
64. rear portion
66. viewing lens
68. lens opening
70. narrow opening
72. retaining clips

What is claimed is:

1. A compact camera comprising a frame counter disk supported for rotation to indicate the number of exposures remaining to be made on a filmstrip, is characterized in that:
   said frame counter disk is flexible, has a curved periphery, is bent along a straight line joining two spaced points on said curved periphery to be located in two different planes in order to conserve space, and has a plurality of exposure related indicia that is moved successively from one of said planes to the other plane as said frame counter disk is rotated.

2. A compact camera as recited in claim 1, wherein a viewing area is positioned adjacent one of said planes to permit said exposure related indicia to be seen successively in that plane as said frame counter disk is rotated.

3. A compact camera as recited in claim 1, wherein a front cover part and a rear cover part form a camera housing that has a narrow opening for said frame counter disk, and said frame counter disk protrudes through said narrow opening to be located in one of said planes outside said camera housing.

4. A compact camera as recited in claim 3, wherein said frame counter disk extends inwardly of said narrow opening to be located in said other plane inside said camera housing.

5. A compact camera as recited in claim 1, wherein said frame counter disk is bent to form a major portion in one of said planes and a minor portion smaller than said major portion in the other plane and has a coaxial support for said major portion.

6. A compact camera comprising a frame counter disk supported for rotation to indicate the number of exposures remaining to be made on a filmstrip, is characterized in that:

said frame counter disk is flexible, is shaped to be located only in two different planes in order to conserve space within said camera, and has a plurality of exposure related indicia that is moved successively from one of said planes to the other plane as said frame counter disk is rotated.

7. A compact camera as recited in claim 6, wherein said planes are perpendicular to one another.

8. A compact camera as recited in claim 6, wherein a camera housing has a top portion over one of said planes and a rear portion over the other plane, and at least one of said top and rear portions has a viewing area for viewing said exposure related indicia as they are moved successively from one of said planes to the other plane.

* * * * *